Oct. 30, 1934.   C. U. BUNDICK ET AL   1,978,878
COMBINED PROJECTOR AND TALKING MACHINE
Filed June 11, 1930   6 Sheets-Sheet 1
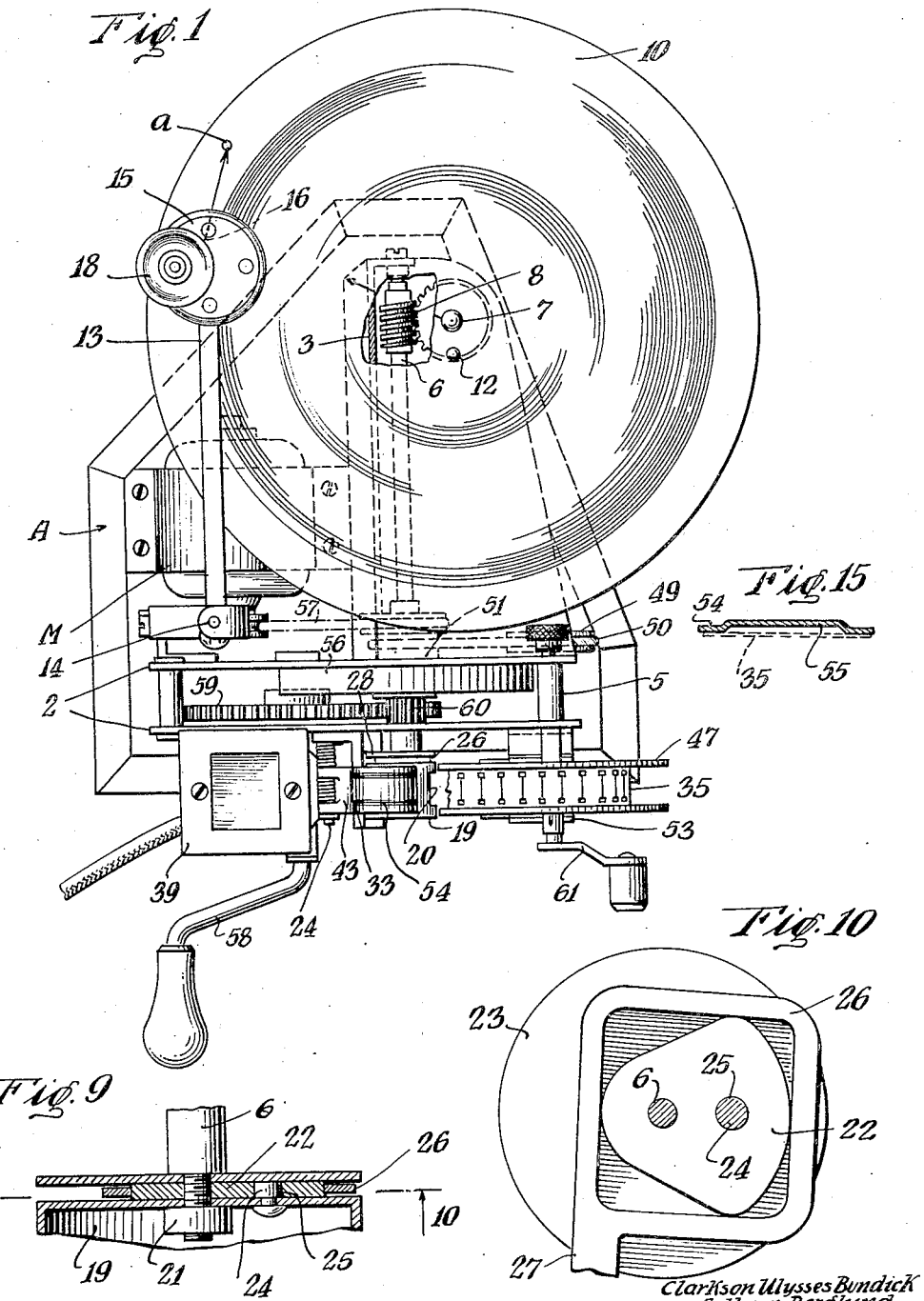

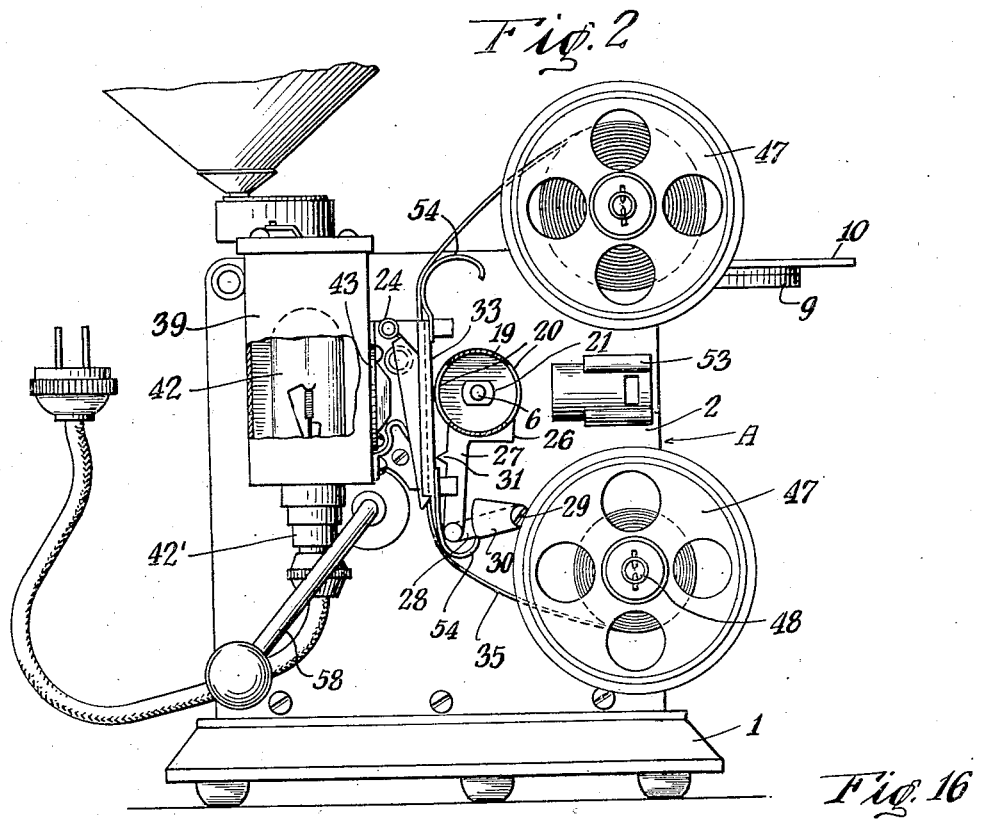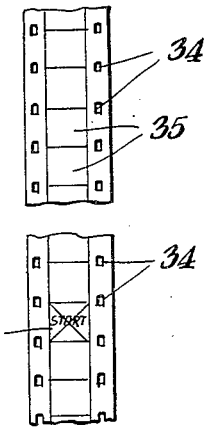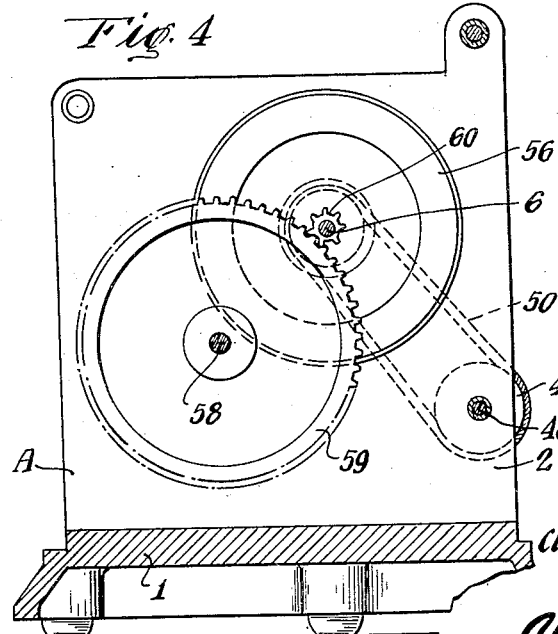

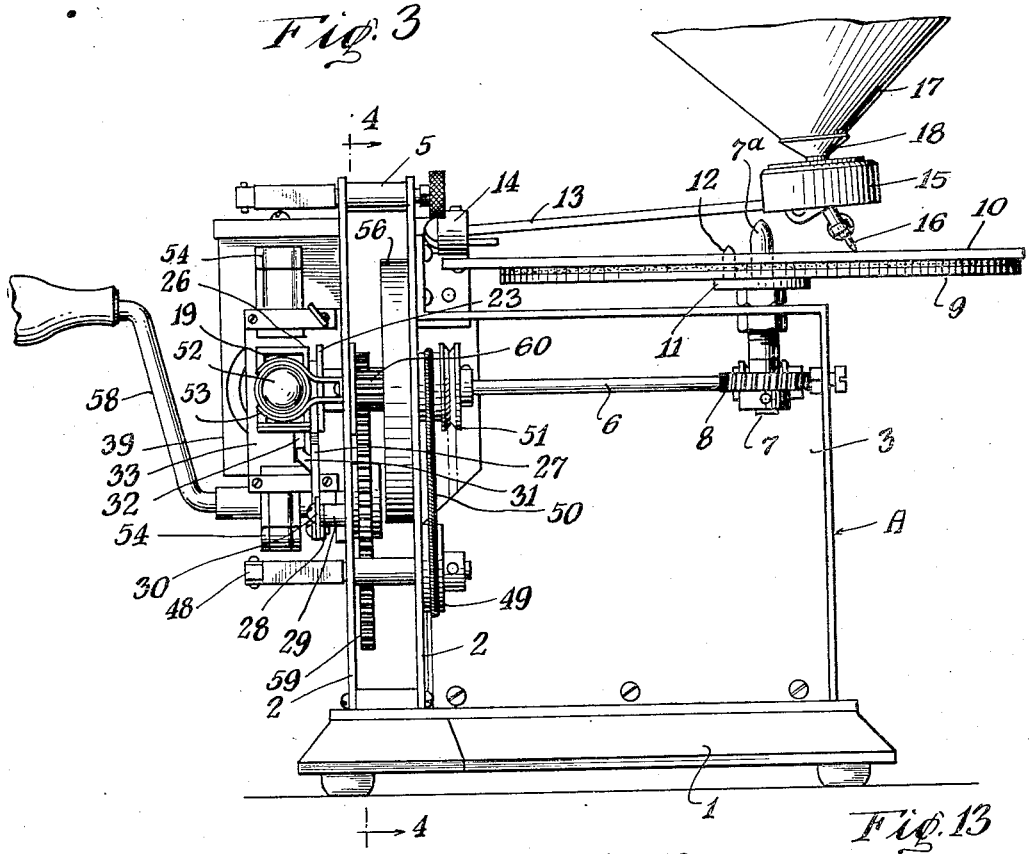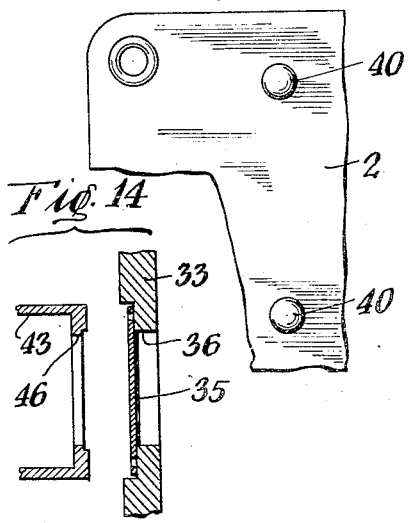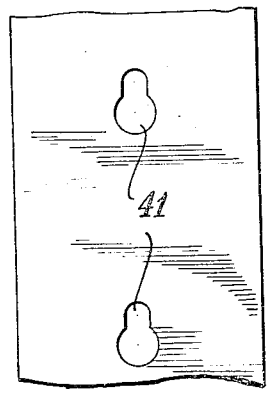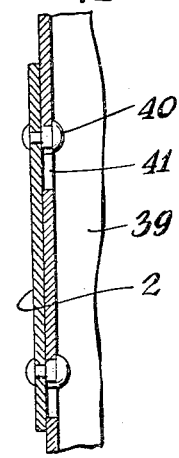

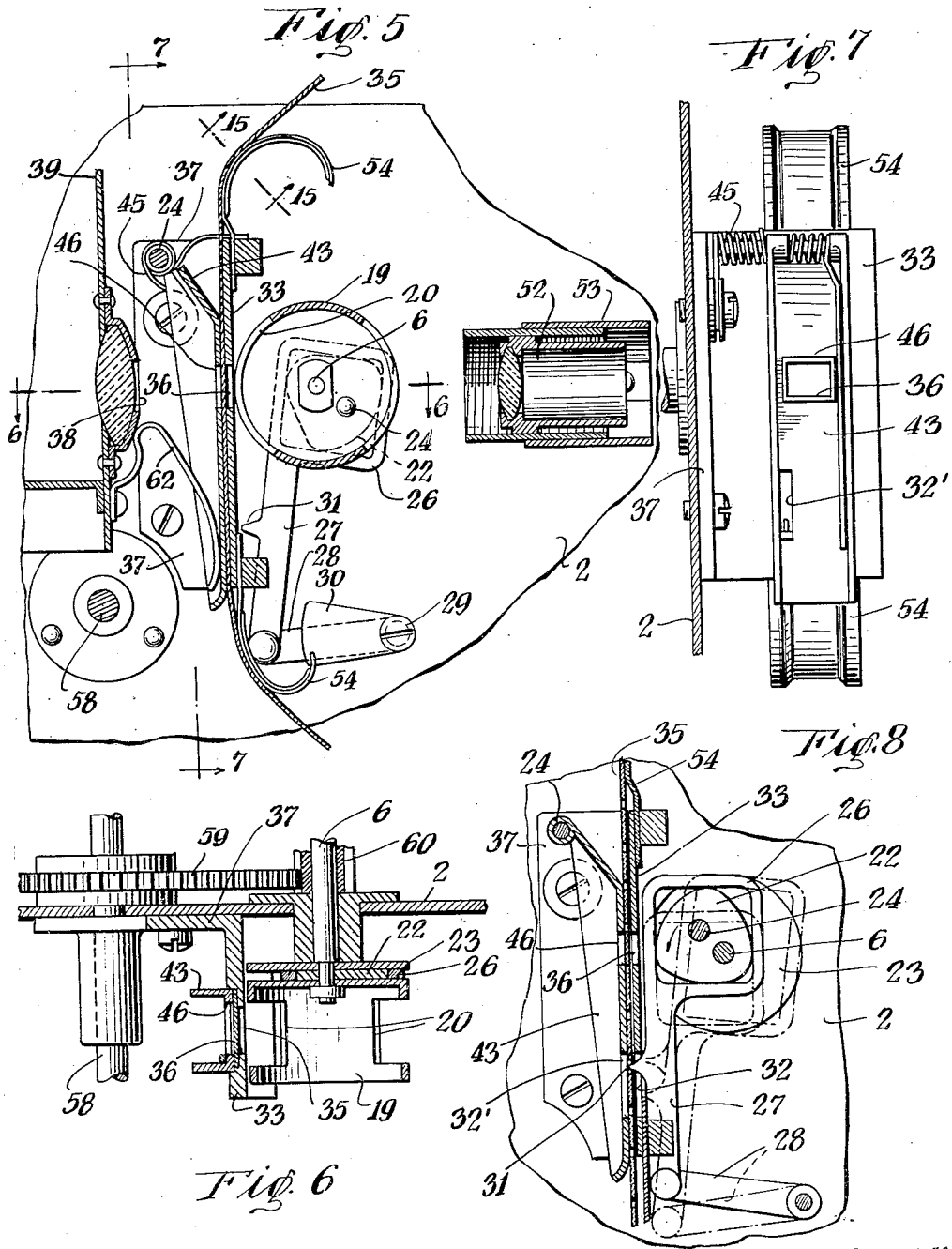

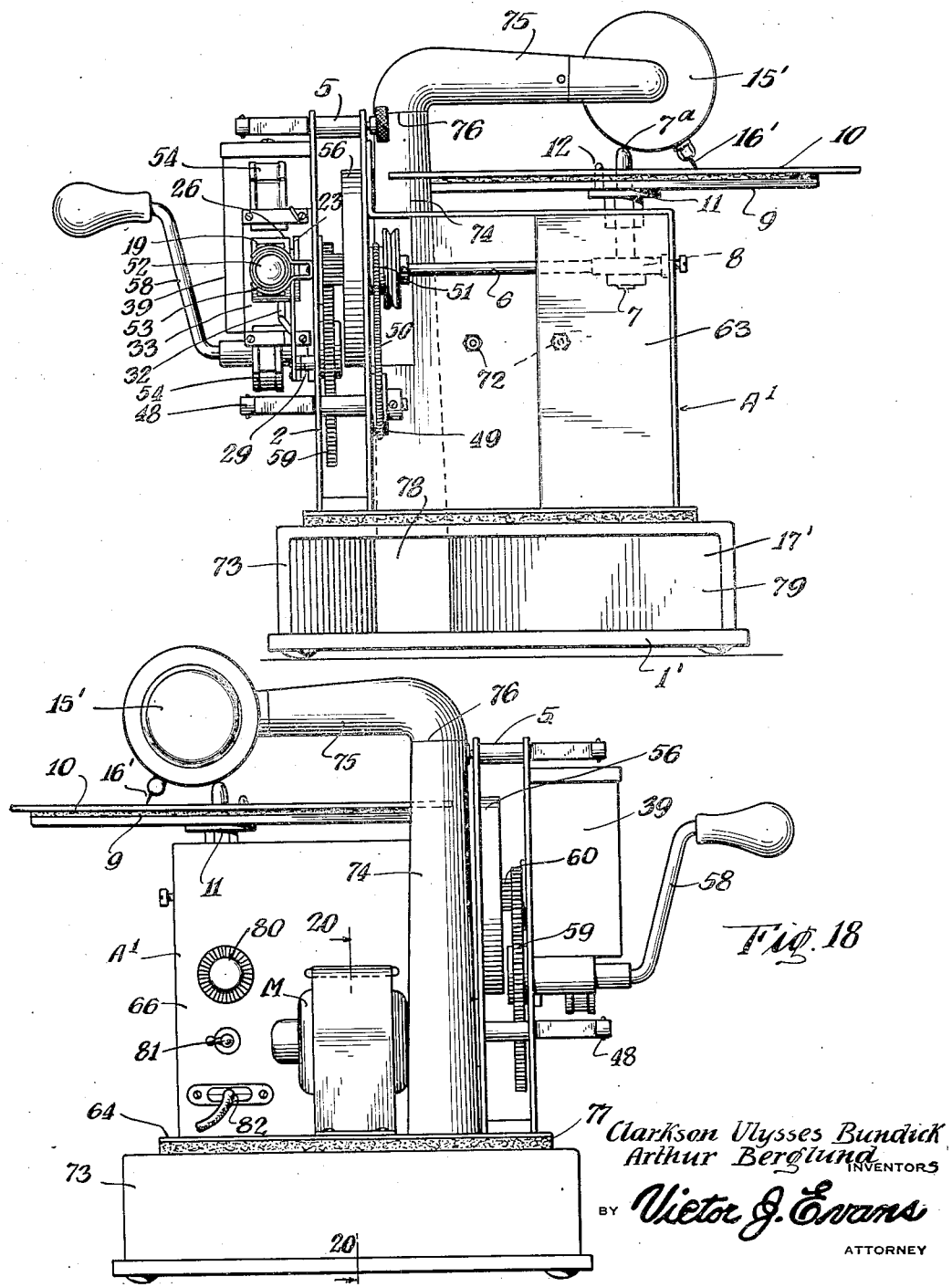

Oct. 30, 1934. C. U. BUNDICK ET AL 1,978,878
COMBINED PROJECTOR AND TALKING MACHINE
Filed June 11, 1930 6 Sheets-Sheet 6

Clarkson Ulysses Bundick
Arthur Berglund
INVENTORS

BY *Victor J. Evans*
ATTORNEY

Patented Oct. 30, 1934

1,978,878

UNITED STATES PATENT OFFICE 1,978,878

COMBINED PROJECTOR AND TALKING MACHINE

Clarkson Ulysses Bundick, White Plains, and Arthur Berglund, Dobbs Ferry, N. Y., assignors, by mesne assignments, to Sprague Specialties Company, a corporation of Massachusetts Application June 11, 1930, Serial No. 460,479

6 Claims. (Cl. 88—16.2)

This invention relates to a combined motion picture projector and sound reproducing machine, the present application being a continuation in part of our application Serial No. 447,668 filed April 26th, 1930.

The general object of the invention is to so construct and arrange the parts of the combined motion picture projector and sound reproducer that the device can be manufactured to sell at low cost and is so simple that it can be operated by a child, with means for operating the shutter, the film feeding means and the turntable of the talking machine from a single shaft so that the reproduced sound is synchronized with the projected motion pictures.

Another object of the invention is to provide means for so rotating one of the film reels from the shaft that the reel will cease to move when the film is not being moved by its feeding device, with spring members engaging the film above and below the film gate, which act as shock absorbers and prevent a strain being placed upon the film.

Still another object of the invention is to equip the machine with a sound reproducer swingably mounted above the turntable, this sound reproducer including a sound conduit terminating in a horn the bell of which is formed within the base of the machine and is directed forwardly so that the sound may be emitted in the same direction as the picture projection, and the entire sound amplifying horn is compactly arranged within the machine.

A still further object of the invention is to efficiently house the film driving and turntable shaft, and its associated parts, beneath the turntable.

Still another object is to effectively cushion the moving parts of the apparatus from the sound emission portion or bell of the horn and deaden the vibration from said moving parts.

Yet another object is to equip the machine with an electric motor whereby the apparatus may be operated automatically, and to provide a resilient bed for the motor thereby further eliminating the deleterious effects of vibration.

Another object is to provide novel means for physically shifting the motor to increase or decrease the tension of the driving belt or connection between the motor shaft and the operating shaft for the turntable and projector mechanism.

Still another object is to provide a handy and convenient portable combination motion picture projector and sound reproducer which will have but few parts and which can be very economically manufactured.

A still further object is to construct a machine of the above type which can be operated automatically by electrical means, or by means of a hand crank, as may be desired.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 is a plan view of the device, with parts in section.

Fig. 2 is a front view, with parts broken away.

Fig. 3 is an elevation of the device.

Fig. 4 is a section on line 4—4 of Fig. 3.

Fig. 5 is a section on line 5—5 of Fig. 3.

Fig. 6 is a section on line 6—6 of Fig. 5.

Fig. 7 is a section on line 7—7 of Fig. 5.

Fig. 8 is a detail view showing the operation of the film feeding means by the cam.

Fig. 9 is a detail sectional view showing how the cam is rotated with the shutter.

Fig. 10 is a section on line 10—10 of Fig. 9.

Fig. 11 is a detail view showing the studs for supporting the lamp housing from the front plate of the frame of the device.

Fig. 12 is a detail view showing the stud receiving openings in the lamp housing.

Fig. 13 is a sectional detail view showing how the studs engage the openings to detachably connect the lamp housing with the frame.

Fig. 14 is a sectional view through the film gate and the door, with the door spaced from the gate.

Fig. 15 is a sectional view through one of the spring members, the section being taken on line 15—15 of Fig. 5.

Fig. 16 is a view of part of the film.

Fig. 17 is a view similar to Fig. 3, showing a preferred, commercial form of the present apparatus.

Fig. 18 is a rear elevation of the preferred form illustrated in Fig. 17, showing the novel motor mounting and the arrangement of the sound conduit and horn.

Figure 19:
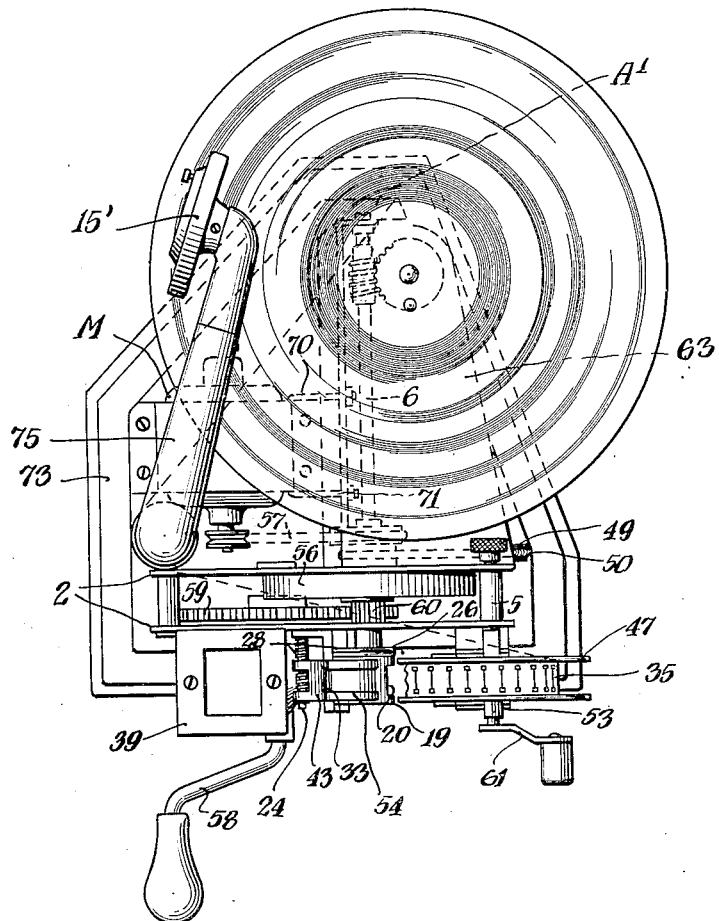
Fig. 19 is a top plan view of the preferred form of the invention illustrated in Figs. 17 and 18.

In these drawings, referring first to Figs. 1 to 16 inclusive, the letter A indicated the frame of the device which is composed of the base 1, the spaced plates 2 connected at their lower ends with the front of the base and the housing 3 connected with the base and with the rear plate 2. The plates 2 are separated by the spacers 5. A horizontal shaft 6 is journaled in the frame and passes through the two plates 2, with a part of the shaft in the housing 3.

A vertically arranged shaft 7 is journaled in the top of the housing and worm gearing 8 connects the shafts 6 and 7 together, the upper end of the shaft 7 being adapted to pass through the turntable 9 as seen at 7a and the record disk 10 and a circular part 11 is fastened to the upper part of the shaft and forms a support for the turntable. This circular part carries an upright locking pin 12 which also passes through a hole in the turntable and a hole in the record disk. This locking pin 12 acts as a positive means for connecting the record disk with the turntable and eliminates danger of the record disk slipping on the turntable.

The sound may be reproduced from the record disk 10 in any suitable or conventional manner. In this instance, however, novel means are provided for this purpose, two modifications of these means being at present shown and described. In one instance an arm 13 is swiveled to a part of the frame, as shown at 14, and the free end of the arm carries the reproducer 15, the stylus 16 of which engages the record disk and a horn 17 is supported from the reproducer by the member 18. Another, and preferred form, will be described at a later point in this specification.

A shutter 19, made in the form of a cylinder with opposing openings 20 in its sides, is fastened to the front end of the shaft 6 by the nut 21 engaging the reduced threaded end of the shaft. A cam 22 is placed between the shutter and a disk 23, the disk and cam having openings therein through which the reduced end of the shaft passes and a pin 24 in the shutter engages a hole 25 in the cam so that the cam must be placed in a certain position relative to the shutter before the parts can be assembled and the pin will hold the parts in this relation. A rectangular part 26 on the upper end of an arm 27 fits over the cam and is held between the shutter and the disk 23 and the lower end of the arm 27 is pivoted to a short arm 28 which is pivoted to the front plate 2, as shown at 29. A spring plate 30 may be held by the pivot 29 and presses against the arm 28 to exert slight pressure on the arm. The arm 27 is formed with a projection 31 which operates through a slot 32 in the film gate 33 to engage the perforations 34 in the film 35 to give the film a step by step movement in the usual manner as the arm 27 is being operated by the cam.

As will be seen, the arm 27 is given a combined reciprocatory and oscillatory movement by the cam so that it will be moved upwardly and then outwardly or toward the film gate so that its projection 31 will pass through the slot 32 and engage a perforation 34 in the film and then the arm is moved downwardly to move the film, after which the arm moves outwardly and upwardly while the film is stationary and then the arm is moved inwardly to again place the projection in engagement with the next perforation in the film thereby moving same step by step. The film gate 33 is formed with the usual aperture 36 and has a flange 37 which is fastened to the front plate 2 with the aperture 36 in alignment with the lens opening 38 of the lamp housing 39 which is detachably supported on the front plate 2 by the studs 40 carried by the front plate engaging the keyhole shaped slots 41 in the housing. This housing carries the usual lamp 42.

A door, or pressure plate 43 is hingedly connected with the flange 37, as shown at 44, and a spring 45 acts to hold the door against the film gate, said door being provided with an aperture 46 which registers with the aperture 36, and with a slot 32' which registers with the slot 32.

The reels 47 for the film are carried by the shafts 48 which pass through upper and lower spacers 5, the lower shaft having a pulley 49 attached thereto over which a spring belt 50 passes, this belt also passing over a pulley 51 on the shaft 6. The film passes between the film gate 33 and the door 43 and the door is pressed against the film by its spring 45, the film gate 33 being channeled to receive the film and the film gate and the door are so formed that only the edges of the film contact the parts so that there is no danger of scratching the face of the film. This arrangement is shown in Fig. 14.

The usual lens barrels 52 are carried by the tubular member 53 which is fastened to the front plate. These barrels are, of course, in alignment with the apertures in the film gate 33 and the door 43. Curved spring members 54 are attached to the ends of the film gate and contact the film between the film gate and the reels and act as shock absorbers for the film, as said members will give if any undue tension is exerted on the film above and below the film gate. Each member is also slightly channeled, as shown at 55 in Fig. 15, so that only the edges of the film contact the member. The shaft 6 is provided with a fly wheel 56 which is located between the two plates 2. The shaft may either be driven from a motor M which is belted to the shaft, as shown at 57, or the shaft may be driven manually through means of the crank handle 58 having a part journaled in the frame and provided with a gear 59 which meshes with a pinion 60 on the shaft.

From the foregoing it will be seen that the rotary movement of the shaft 6 is imparted to the turntable and the record disk thereon so that the talking part of the apparatus is operated from the shaft and said shaft also rotates the shutter to cause the same to control the light rays passing from the lamp housing through the film to the lens in the barrels 52 and said shaft also operates the cam which actuates the feeding means for the film in timed relation to the shutter 19. Thus both the talking part and the projecting part of the apparatus are actuated from the one shaft so that the sound will be synchronized with the pictures as the apparatus is started with the film and the record at set marks.

Attention is called to the simplicity of the apparatus, which enables it to be manufactured to sell at low cost and to the ease with which the film can be threaded up as it is simply necessary to lift the door 43, place the film in the film gate, release the door allowing it to press the film between itself and the film gate, and attach the film to the take-up reel. When the shutter is removed and replaced, there is no danger of getting the cam out of its proper relation with the shaft, as the pin 24 must be placed in the hole 25 before the parts can be assembled.

A starting mark $a$ is placed on the record and a starting mark $b$ is placed on the film, whereby the stylus of the reproducer is set at a and with the mark b on the film framed in the aperture, the picture and the sound will be in synchronism when the machine is run. The socket 42' for the lamp is preferably frictionally held in the bottom of the lamp housing so that the lamp can be adjusted in the lamp housing to cause the rays of light to properly pass through the lens of the housing.

By using a spring belt 50, it will readily slip when the film is not moving so that the lower reel is not turned when the film is not being moved by its feeding means. A detachable handle 61 is provided for the shaft of the upper reel so that said upper reel can be turned to rewind the film thereon.

A spring 62 is attached to the lamp housing and bears against the door 43, this spring acting with the spring 45 to hold the door against the gate 33 also tends to frictionally hold the lamp housing on the studs.

Figure 20:
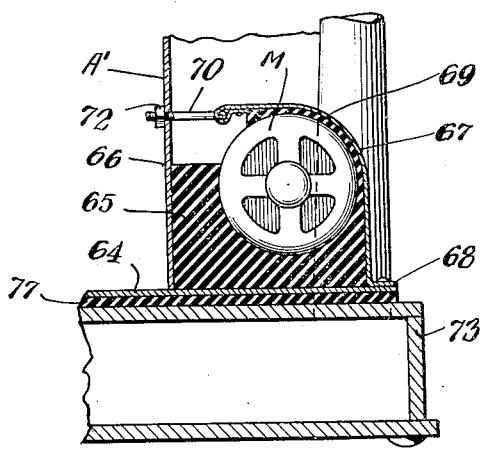
Fig. 20 is a detail sectional view illustrating the resilient bed for the motor and the novel means for bodily shifting the motor for purposes of belt adjustment.

In Figs. 17 to 20 inclusive we illustrate a preferred form of the complete apparatus. In this instance the turntable 9 is mounted above a housing A', which housing supplants the frame A already referred to. This housing A' encloses the main shaft 6 and the operative connections between this shaft 6 and the turntable spindle 7, pulleys 49 and 51, and electric motor M. This housing A' has one or more cover plates 63 secured to the front of the housing A' in such manner that the cover plates 63 may be readily removed when desired to gain access to the mechanism enclosed within the housing A'.

In this instance novel means are provided for mounting the electric motor M upon the bottom 64 of the housing A'. A resilient bed 65, formed of rubber or other resilient or cushioning material is provided adjacent the rear wall 66 of the housing A'. This bed 65 being of appreciable height so as to practically completely surround the motor M while affording a lower cushioning portion immediately beneath the motor of sufficient height to efficiently deaden the vibration of the motor. Novel means are also provided to adjust the tension of the belt 57 which connects the electric motor with the shaft 6. In the present instance this belt adjustment is accomplished by shifting the motor bodily toward or away from the shaft 6. To accomplish this shifting of the motor we provide a flexible metal strap 67 one end of which is secured to the bottom 68 and the opposite end of which strap 67 extends over the top of the motor, where means are provided to draw the strap toward the rear wall 66 of the housing A', this drawing upon the strap causing the motor to move toward the wall 66 by reason of the compression of the resilient material making up the bed 65. As seen at 69 the resilient material of the bed is extended around the motor beneath the strap 67 so that the motor is practically completely surrounded by the cushioning or resilient material. The upper end of the strap 67 is connected to a pair of bolts 70 and 71 the ends of which bolts extend through the rear wall 66, the threaded ends of the bolts 70 and 71 being equipped with nuts 72 by which the strap 67 may be secured in the desired adjusted position. The nuts 72 are accessible for manipulation by removing one or the other of the cover plates 63. By simply tightening or loosening the nuts 72 the motor will be moved toward or away from the shaft 6.

The entire motion picture projector mechanism and the turntable driving means, including the motor M are in this instance effectively insulated from the sound reproducing means so that the sound reproduction will not be deleteriously effected by vibration of any of the moving parts. In this instance the entire mechanism is mounted upon a relatively shallow base 73 this base 73 being constructed to include the acoustic properties of a horn and being thus employed for purposes of sound emission. This hollow base 73 is provided with a vertically extending sound conduit 74, the upper end of this sound conduit 74 having a tone arm 75 swiveled thereto as indicated at 76. The tone arm 75 is equipped with a reproducer 15' preferably of the acoustic type this reproducer 15' carrying the stylus 16'. Sound and vibration deadening material 77 is interposed between the base of the housing A' and the top of the hollow base 73.

The lower end of the sound conduit 74 communicates directly with the interior of the hollow base 73 as indicated at 78. The open portion 79 of the interior of the hollow base 73, which open portion 79 constitutes the bell of the horn, is directed toward the front of the machine in a plane parallel with the motion picture projection, whereby the sound is emitted directly toward the motion picture screen.

The housing A' also encloses the electrical connections between the motor M and the rheostat 80, switch 81 and plug-in socket 82, these parts 80, 81 and 82 being mounted at the exterior of the rear wall 66.

The construction of the preferred modification just described provides a very compact, convenient, and efficient portable combination motion picture projector and sound reproducer unit which can be economically manufactured and sold to the public and which is extremely efficient in its production of the results desired.

The hereinbefore described constructions admit of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What we claim is:—

1. A combined projector and talking machine comprising a base shaped to include the acoustic properties of a horn, a casing supported on said base, a shaft journaled in said casing and enclosed thereby, a record supporting turntable rotated by said shaft, a second shaft journaled in the casing and geared to said first shaft, a shutter carried by the second shaft, film feeding means actuated by the second shaft, a film gate through which the film passes, a lamp housing, the rays of light from which pass through an aperture in said film gate and through said shutter, a lens barrel carried by the casing for projecting the light rays, means for rotating the second shaft, a reproducer mounted on said base the stylus of which is adapted to engage the record on the turntable, and a conduit connecting said reproducer with the horn cavity in said base.

2. A combined projector and talking machine comprising a base shaped to include the acoustic properties of a horn, a casing supported on said base, a shaft journaled in said casing and enclosed thereby, a turntable carried by the shaft and adapted to support a record, a reproducer movably mounted above said base and having its stylus engaging the record, a second shaft journaled in the casing and geared to the first shaft, a shutter connected with the second shaft, a film gate adjacent the shutter, a film strip, means for feeding the same over said gate, means for operating the film feeding means by the second shaft, a pivoted door for holding the film against the gate, a lamp, means for directing the rays of light therefrom through the film gate, a lens barrel for projecting the rays of light passing through the shutter, means for rotating the second shaft, and a conduit connecting said reproducer with the horn cavity in said base.

3. A combined projector and talking machine comprising a base shaped to include the acoustic properties of a horn, a casing supported on said base, a shaft journaled in said casing and enclosed thereby, a turntable carried by the shaft and adapted to support a record, a reproducer movably supported on the base and having its stylus engaging the record, a second shaft journaled in the casing and geared to the first shaft, a shutter connected with the second shaft, a film gate having its aperture adjacent the shutter, a film strip, means for feeding the same through the gate, means for operating the film feeding means by the second shaft, a pivoted door for holding the film against the gate, a lamp, means for directing the rays of light therefrom through said aperture, a lens barrel for projecting the rays of light passing through the shutter, means for rotating the second shaft, the film feeding means comprising an arm having a projection thereon for engaging holes in the film, a cam connected with the second shaft for actuating the arm, and a conduit connecting said reproducer with horn cavity in said base.

4. A combined projector and talking machine including a base shaped to include the acoustic properties of a horn, a casing supported on said base, a shaft journaled in said casing and enclosed thereby, a turntable carried by the shaft and adapted to support a record, a reproducer movably supported on the base and having its stylus engaging the record, a second shaft journaled in the casing and geared to the first shaft, a shutter connected with the second shaft, a film gate having its aperture adjacent the shutter, a film strip, means for feeding the same through the gate, means for operating the film feeding means by the second shaft, a pivoted door for holding the film against the gate, a lamp, means for directing the rays of light therefrom through the aperture in the gate, a lens barrel for projecting the rays of light passing through the shutter, means for rotating the second shaft, the film feeding means comprising an arm having a projection thereon for engaging holes in the film, a cam connected with the second shaft for actuating the arm, a pin on the shutter engaging a hole in the cam for holding the cam in fixed relation to the shutter, and a conduit connecting said reproducer with the horn cavity in said base.

5. A combined projector and talking machine comprising a base shaped to include the acoustic properties of a horn, a casing, a lamp housing detachably connected with the front part of the casing, a lamp in the housing, a vertically arranged apertured film gate connected with the front of the casing and having its aperture arranged in alignment with the opening in the lamp housing, a spring actuated pivoted door for pressing a film strip against said gate, said door also having an aperture therein, a shaft journaled in the casing, a cylindrical shutter fastened to one end of the shaft and having opposing openings in its side walls, said shutter controlling the light rays passing through both said apertures, a lens barrel adjustably connected with the front of the casing and in alignment with the apertures, a cam carried by the shaft having a hole therein, a pin carried by said shutter engaging the hole, a short arm pivoted to the front of the frame, an upright arm pivoted to said short arm and having a rectangular part at its upper end engaging said cam, a projection on the upright arm, the film gate and door having slots therein through which the projection operates to feed a film strip through said film gate, means for rotating the shaft, a vertically arranged shaft journaled in the casing and geared to the first shaft, a turntable carried by the vertical shaft, a reproducer swiveled on said base having a stylus engaging a record on the turntable, and a conduit connecting said reproducer with the horn cavity in said base.

6. A combined projector and talking machine comprising a base shaped to include the acoustic properties of a horn, a casing supported on said base, a lamp housing detachably connected with the front part of the casing, a lamp in the housing, a vertically arranged apertured film gate connected with the front of the casing and having its aperture arranged in alignment with an opening in the lamp housing, a spring actuated pivoted door for pressing a film strip against the gate, said door also having an aperture therein, a shaft journaled in the casing, a lens barrel adjustably mounted on said frame in alignment with said apertures, a cylindrical shutter fastened to one end of the shaft and having opposing openings in its side walls, said shutter controlling the light rays passing to said lens barrel, a cam carried by the shaft having a hole therein, a pin carried by the shutter engaging said hole, a short arm pivoted to the front of the casing, an upright arm pivoted to said short arm and having a rectangular part at its upper end engaging said cam, a projection on the upright arm, the film gate and door having slots therein through which the projection operates to feed a film strip through the film gate, means for rotating the shaft, a vertically arranged shaft journaled in the casing and enclosed thereby and geared to the first shaft, a turntable carried by the vertical shaft, a tone arm mounted on said base communicating with the horn cavity therein and a reproducer swiveled to said tone arm and the stylus of which engages a record on the turntable, upper and lower reels rotatably supported by the front of the casing and to which the film strip is connected, means for frictionally driving one reel from the first shaft and spring members connected with the ends of the film gate and contacting the film strip.

CLARKSON ULYSSES BUNDICK.
ARTHUR BERGLUND.